United States Patent
Lee et al.

(10) Patent No.: US 6,785,449 B2
(45) Date of Patent: Aug. 31, 2004

(54) MULTIMODE INTERFERENCE COUPLER, MULTI-LAYER OPTICAL PLANAR WAVEGUIDE USING THE SAME AND METHOD OF MANUFACTURING THE SAME

(75) Inventors: Jong Moo Lee, Daejon-shi (KR); Doo Hee Cho, Daejon-shi (KR); Joon Tae Ahn, Daejon-shi (KR); Myung Hyun Lee, Daejon-shi (KR); Kyong Hon Kim, Daejon-shi (KR)

(73) Assignee: Electronics and Telecommunications Research Institute (KR)

( * ) Notice: Subject to any disclaimer, the term of this patent is extended or adjusted under 35 U.S.C. 154(b) by 180 days.

(21) Appl. No.: 10/213,824

(22) Filed: Aug. 6, 2002

(65) Prior Publication Data

US 2003/0215189 A1 Nov. 20, 2003

(30) Foreign Application Priority Data

May 14, 2002 (KR) .......................................... 2002-26406

(51) Int. Cl.[7] .................................................. G02B 6/42
(52) U.S. Cl. ........................... 385/50; 385/14; 385/130; 385/131
(58) Field of Search ...................... 385/14, 50, 129–130

(56) References Cited

U.S. PATENT DOCUMENTS 6,115,515 A    9/2000  Itoh et al.
6,282,335 B1 * 8/2001  Losch et al. .............. 385/14 X

OTHER PUBLICATIONS

J. Appl. Phys. Jan. 15, 1998, "Vertically stacked coupler and serially grafted waveguide: Hybrid waveguide structures formed using an electro–optic polymer", T. Watanabe, et al., 11 pages.

Appl. Phys. Lett. Jun. 14, 1993, "Multilevel registered polymeric Mach–Zehnder intensity modulator array", T. Tumolillo, et al., 3 pages.
IEEE Photonics Technology Letters, vol., 8, No. 6, Jun. 1996, "Accurate Analysis of Multimode Interference Devices", B. Rahman, 3 pages.
1998 IEEE, "Ion–Exchanged Glass Waveguides: A Review", R. Ramaswamy, et al., 19 pages.
1999 IEEE, "Wavelength Trimming of a Microring Resonator Filter by Means of a UV Sensitive Polymer Overlay", S. Chu, et al, 3 pages.
2000 IEEE, "Double–Bonded InP–InGaAsP Vertical Coupler 1:8 Beam Splitter", M. Rabum, et al., 3 pages.
2001 IEEE, "InP–InGaAsP Wafer–Bonded Vertically Coupled X–Crossing jultiple Channel Optical Add–Drop Multiplexer", M. Raburn, et al., 3 pages.

* cited by examiner

*Primary Examiner*—Phan T. H. Palmer
(74) *Attorney, Agent, or Firm*—Blakely Sokoloff Taylor & Zafman

(57) ABSTRACT

The present invention relates to a multi-layer optical planar waveguide which is vertically coupled using multimode-interference couplers and to the method of manufacturing the same. The purpose of this invention is to increase the degree of integration on the multi-layer optical planar waveguide by applying the concept of via holes of the multi-layer printed circuit board (MLPCB) used in electronic circuits to the optical waveguide devices. According to the present invention, particularly, a multimode interference coupler of a stepped structure has the higher coupling ratio at relatively short length of interference than the usual multimode interference coupler. The present invention can implement a multimode interference coupler at a specialized spot while reducing evanescent field interference between the upper and lower optical waveguides out of the spot by separating the layers enough.

22 Claims, 14 Drawing Sheets

MULTIMODE INTERFERENCE COUPLER, MULTI-LAYER OPTICAL PLANAR WAVEGUIDE USING THE SAME AND METHOD OF MANUFACTURING THE SAME

BACKGROUND OF THE INVENTION

1. Field of the Invention

The invention relates to a multi-layer optical planar waveguide which is vertically coupled using multimode interference (MMI) couplers and to the method of manufacturing the same. The purpose of this invention is to increase the degree of integration on the multi-layer optical planar waveguide by applying the concept of via holes of the multi-layer printed circuit board (MLPCB) used in electronic circuits to the optical waveguide devices.

2. Description of the Prior Art

As the technology of optical communications are advanced, various optical planar waveguide technologies have been developed in order to fabricate various integrated optical components such as optical couplers optical switches, optical amplifiers, and so on.

Recently, as the optical planar waveguide has been actively applied in optical communications, the higher integration of the optical planar waveguide devices and the integration of various optical planar waveguide devices on an optical board are frequently demanded. For example, U.S. Pat. No. 6,115,515 (hereinafter, 'reference document 1') entitled "Optical Device Mounting Board" issued to M. Itoh, et al. on Sep. 5, 2000 discloses a method by which various optical planar waveguide devices are transversely arranged on an optical board and connected respectively.

The reference document 1 discloses the invention allowing simple attachment of photoelectric devices such as the optical waveguide device as indicated in the title. In the reference document 1, various optical planar waveguide devices are arranged on a mounting board on which grooves are engraved, so that the waveguides are easily connected. This technical idea is one of the methods to connect the optical planar waveguide devices liven though this technical idea can partly contribute to overcoming the difficulty in the connection of various optical waveguide devices, the process should accompany the economical problem in using the expensive aligning equipments, the problem of long process time and the complexity in fabrication. Also, as in the reference document 1 there is a limit in integration using the technical idea in which the optical planar waveguides are transversely connected on a board.

The multi-layer optical planar waveguide with the vertical structure can be another way to simplify the integration of waveguide devices. 1, or example, the multi-layer optical planar waveguide of the vertical structure was disclosed in "Double-Bonded InP—InGaAsP Vertically Coupler 1:8 Beam Splitter" (hereinafter, 'reference document 2') by M. Raburn, et al in IEEE Photon. Technol. Lett. (2000) and "InP—InGaAsP Wafer-Bonded Vertically Coupled X-Crossing Multiple Channel Optical Add-Drop Multiplexer" (hereinafter, 'reference document 3') by M. Raburn, et al in IEEE Photon. Technol. Lett. (2001).

The reference document 2 discloses a 1:8 beam splitter in which optical planar waveguides of multiple layers are formed in order to increase the degree of integration. The reference document 2 tried to improve the degree of integration of the optical planar waveguide device, by using the coupling characteristics of evanescent field interference between the upper and the lower optical planar waveguides, in which the gap between the upper and the lower layers is narrower than 1 $\mu$W, or narrower than the width of the waveguide itself. In addition, the reference document 3 is about a filter using optical waveguides of two layers and discloses a technical idea in which the degree of integration of the optical planar waveguide device is improved using the coupling characteristics of evanescent field interference between the upper and the lower waveguides as in the reference document 2. These prior arts, however, have a significant limitation that the optical planar waveguide on the upper and the lower layers is highly dependent each other since the gap between the upper and the lower layers is too narrow. There should be high interference between the layers due to the evanescent field with such a narrow gap.

In addition, technologies about the multi-layer optical planar waveguide with vertical structure include "Vertically Stacked Coupler and Serially Grafted Waveguide: Hybrid Waveguide Structures Formed Using an Electro-Optic Polymer" (hereinafter, 'reference document 4') by T. Watanabe, et al in 'J. Appl. Phys. (1998), and U.S. Pat. No. 6, 282, 335 (hereinafter, 'reference document 5') entitled "Thermo-Optic Switch" (Aug. 28, 2001).

The reference document 4 discloses an electro-optic switch with relatively low loss using two layer optical waveguides with the lower layer made of electro-optic material, whose loss is generally quite high, and the upper layer made of passive material with low loss. In addition, the reference document 5 discloses a thermo-optical switch in which the main waveguide is formed with glass and in which polymer waveguide with high thermo-optical coefficient is transversely arranged on the glass waveguide, so that light travels from the glass waveguide to the polymer waveguide controlled by the heat applied to the polymer. These two reference documents 4 and 5, however, have the same limitation that the optical planar waveguide on the upper and the lower layers is highly dependent each other since the gap between the upper and the lower layers is too narrow. There should be high interference between the layers due to the evanescent field with such a narrow gap.

As described above, the documents referred made some progress in implementing a switch or a filter using the multi-layer optical planar waveguide structure but have a significant limit in designing because the layers cannot be operated independently in case they are overlapped while the gap between the upper and lower layers should be maintained as narrow as possible to couple the layers directly by the evanescent field interference.

Meanwhile, a technical idea of implementing a multi-layer optical planar waveguide of an independent structure includes "Multilevel Registered Polymeric Mach-Zehnder Intensity Modulator Array" (hereinafter, 'reference document 6') by T. A. Tumolillo, Jr. et al in Appl. Phys. Lett" (1993). In the reference document 6, a multi-layer optical planar waveguide device with little interference between the upper and lower layers is implemented. However, the reference document 6 does not disclose how to connect the upper and lower layers. Therefore, there is a need for a technology by which the optical waveguide on the upper and the lower layers can be vertically connected while the interference between the each layer of the multi-layer optical planar waveguide is minimized.

SUMMARY OF THE INVENTION

The present invention is contrived to solve the above problems and an object of the present invention is to provide a multimode interference coupler capable of connecting the optical waveguides on the upper and the lower layers with high coupling ratio at a specialized spot while maintaining the interference between the each layer of the multi-layer optical planar waveguide out of the spot as minimum by keeping the each layer at an enough distance.

Another object of the present invention is to provide a multimode interference coupler with at least one stepped structure in order to increase the coupling ratio between the optical waveguides on the upper and the lower layers.

Still another object of the present invention is to provide a multi-layer optical planar waveguide implemented using a multimode interference coupler of the stepped structure.

Still another object of the present invention is to provide a method of manufacturing a multi-layer optical planar waveguide with a multimode interference coupler.

In order to accomplish the above object, a multimode interference coupler according to the present invention, is characterized in that it comprises an optical waveguide for a multimode interference coupler inserted at a specialized region between a lower optical waveguide and an upper optical waveguide so that the lower optical waveguide and the upper optical waveguide can be vertically connected, wherein the thickness of the optical waveguide for the multimode interference coupler is larger than the thickness of the optical waveguide to minimize the interference between the lower and the upper optical waveguide out of the region.

Further, a method of manufacturing a multi-layer optical planar waveguide according to the present invention, is characterized in that it comprises the steps of forming a lower core layer at a given portion of a substrate; coating a clading material on the entire structure; etching the clading material so that a portion of a lower core layer at a region where a multimode interference coupler will be formed, thus forming a lower clad layer; coating a core material on the entire structure; etching the core material to form a multimode interference coupler and an upper core layer; and coating the cladding material on the entire structure to form an upper clad layer.

In addition, a method of manufacturing a multi-layer optical planar waveguide according to the present invention, is characterized in that it comprises the steps of forming a lower core layer at a portion of a glass substrate using ion-exchanged method; coating photosensitive polymer the refractive index of which is changed by means of UV light on the entire structure; forming an upper core layer at a portion in the photosensitive polymer; forming an upper clad layer on the entire structure; locating a metal mask on the upper clad layer corresponding to a region where a multimode interference coupler will be formed; and illuminating an UV light on the entire structure to form the multimode interference coupler and a lower clad layer in the photosensitive polymer.

BRIEF DESCRIPTION OF THE DRAWINGS

The aforementioned aspects and other features of the present invention will be explained in the following description, taken in conjunction with the accompanying drawings, wherein:

FIG. 22 are cross-sectional views of the waveguide for describing a method of manufacturing a lower core layer in the steps of FIG. 20a and FIG. 21a.

DETAILED DESCRIPTION OF PREFERRED EMBODIMENTS

The present invention will be described in detail by way of a preferred embodiment with reference to accompanying drawings.

Before explaining a multi-layer optical planar waveguide according to the preferred embodiments of the present invention, the concept, in which upper and lower wires of a multi-layer printed circuit board in a common electronic circuit are connected, will be described in short by referring to FIG. 23.

Figure 23:
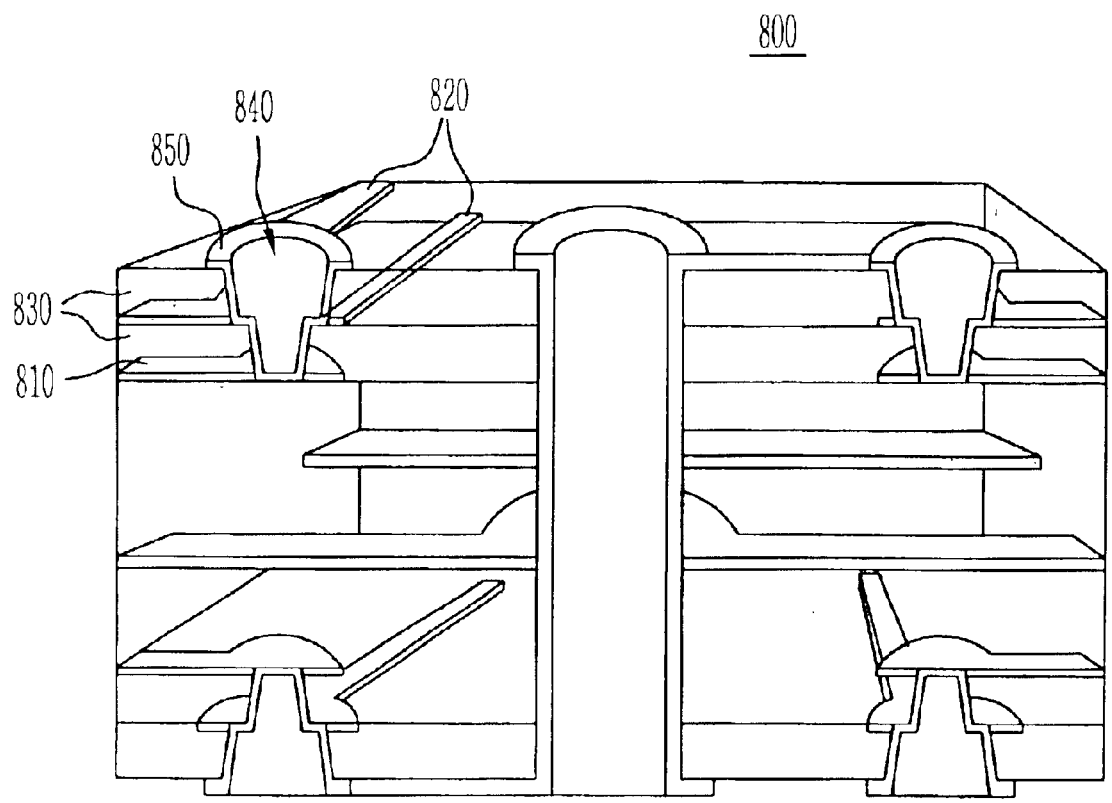
FIG. 23 is a schematic diagram for describing a multi-layer printed circuit board in general electronic circuits.

Referring to FIG. 23, an interlayer insulating film 830 is formed between upper wire 820 and lower wire 810 for electrical isolation in a multilayer printed circuit board 800.

Next, in order for specific portions of the upper wire 820 and the lower wire 810 to be electrically connected, a portion of the interlayer insulating film 830 is drilled to form a via hole 840. The via hole 840 is filled with conductive material such as metal so that the lower wire 810 and the upper wire 820 are electrically connected. Thereby, higher integration of electronic circuits becomes possible.

However, there are many problems in applying this concept of an electrical connection between the upper and the lower layers of the multi-layer printed circuit board in the electronic circuit to the optical waveguide. For example in order to connect the upper layer and the lower layer of the optical waveguide as in the electronic circuit, it is required that the optical waveguide itself be severely bent. Due to this, however, serious optical loss Lip to about 100% occurs at the bending portion of the optical waveguide. In this regard, the present invention employs the concept of planar multimode interference-coupling, disclosed in IEEE Photon. Technol. Lett. entitled as "Accurate Analysis of Multimode Interference Devices" by B. M. A Rahman, et al. (1996), for the vertical coupling between the optical waveguides on the upper and the lower layers of a vertical structure.

Figure 1:
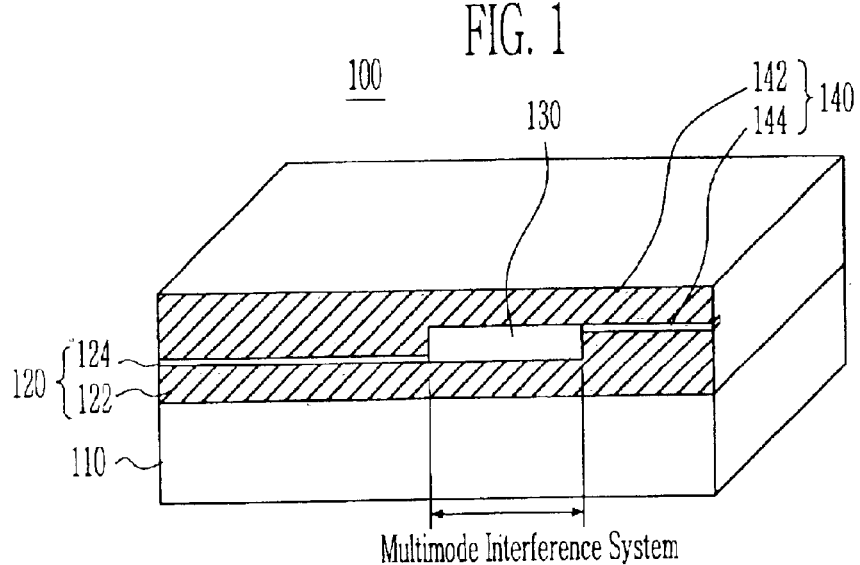
FIG. 1 is a schematic diagram of a multi-layer optical planar waveguide according to a first embodiment of the present invention.
Figure 2A:
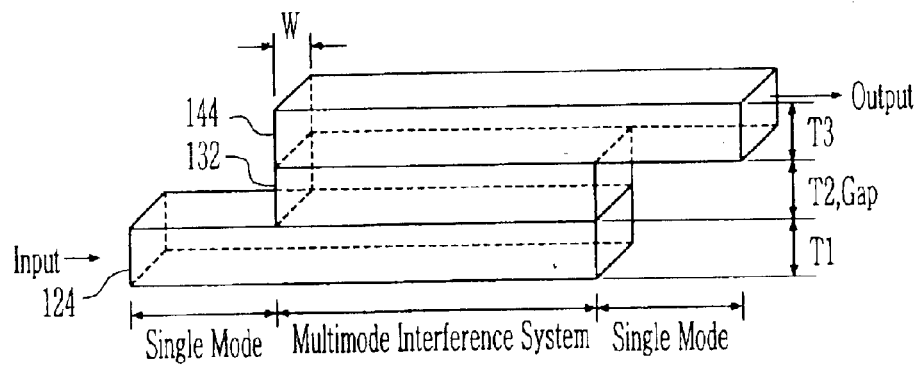
FIG. 2a and FIG. 2b are three-dimensional drawings of the multimode interference coupler shown in FIG. 1.
Figure 2B:
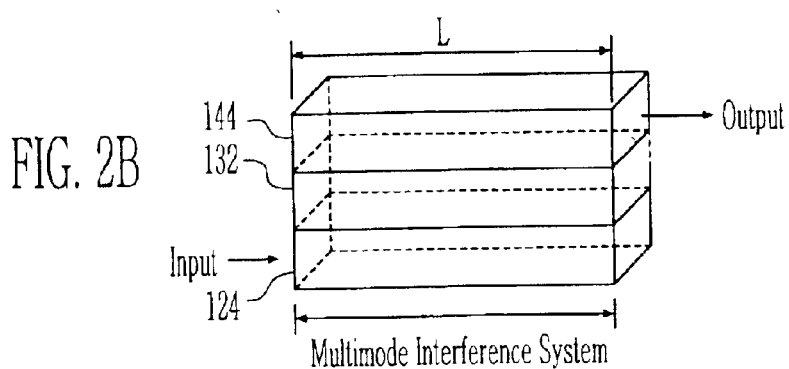

FIG. 1 is a schematic diagram of a multi-layer optical planar waveguide according to a first embodiment of the present invention.

Referring now to FIG. 1, the multi-layer optical planar waveguide 100 includes a lower optical waveguide 120 vertically formed on silicon or glass substrate 110, a multimode interference coupler 130 and an upper optical waveguide 140.

The lower optical waveguide 120 consists of a single mode optical waveguide having a clad layer 122 and 142 and a lower core layer 124. Also the upper optical waveguide 140 consists of a single mode optical waveguide having a clad layer 122 and 142 and an upper core layer 144.

The multimode interference coupler 130 is located between the lower waveguide layer 120 and the upper waveguide layer 140, at a specific portion between the lower optical waveguide 120 and the upper optical waveguide 140. The light is transferred from the lower optical waveguide 120 to the upper optical waveguide 140 or reversely through the multimode interference-coupling region.

In the concrete, the multimode interference coupler 130 is located between the lower clad layer 122 and the upper clad layer 142, as shown in FIG. 1. And the multimode interference coupler 130 includes the optical waveguide 132 for a multimode interference coupler connected to portions of the lower core layer 124 and the upper core layer 144, portions of the lower core layer 124 and the upper core layer 144 that are connected to the optical waveguide 132 for the multimode interference coupler.

The optical waveguide 132 for the multimode interference coupler is located between the lower core layer 124 and the upper core layer 144. The bottom surface of the optical waveguide 132 is connected to the top surface of the lower core layer 124. The top surface of the optical waveguide 132 is connected to the bottom surface of the upper core layer 144. Therefore, portions of the lower core layer 124 and the upper core layer 144 are overlapped with the optical waveguide 132 for the multimode interference coupler intervened between them. At this time, the optical waveguide 132 for the multimode interference coupler consists of single mode or multimode optical waveguide.

As described above, the multimode interference coupler 130 includes the lower core layer 124 of the lower optical waveguide 120 being the single mode optical waveguide, the upper core layer 144 of the upper optical waveguide 140 being the single mode optical waveguide, and the optical waveguide 132 for the multimode interference coupler consisting of single mode or multimode optical waveguide. Therefore, the multimode interference coupler 130 has enough height (T) (i.e., T=T1+T2+T3) so that the multimode can exist as in the multimode optical waveguide. If an incident light from the lower optical waveguide 120 arrive this region a plurality of multimode can be induced. Thus, the outgoing light Coupled to the upper optical waveguide 140 through the multimode interference coupler 130 can be obtained by overlapping the multimode induced in the multimode interference coupler 130.

In the concrete, if the thickness T1 of the lower core layer 124 in the lower optical waveguide 120 and the thickness T3 of the upper core layer 144 in the upper optical waveguide 140 are the same while the thickness T2 of the optical waveguide 132 for the multimode interference coupler is far less than T1, light can be transmitted well from the upper optical waveguide 140 to the lower optical waveguide 120 or reversely. However, in that case, the evanescent field interference becomes serious at a portion where the lower optical waveguide 120 and the upper optical waveguide 140 are overlapped. Therefore, it is preferred that the thickness T2 of the optical waveguide 132 for the multimode interference coupler is greater than the thickness T1 of the lower core layer 124 in the lower optical waveguide 120 and the thickness T3 of the upper core layer 144 in the upper optical waveguide 140.

Meanwhile, the length L of the multimode interference coupler 130 is the same to the length of the optical waveguide 132 for the multimode interference coupler. The length L for the optimal self-image of input to the output of the multimode interference coupler 130 can be obtained From Equation 1.

$$L = P(3L_\pi)$$ [Equation 1]

where P is an integer and L, indicates the coupling length, which can be expressed as the following Equation 2.

$$L_{\pi-\pi/(\alpha_0}31\ \beta_1) \approx (4n_g W_c^2)/(3\lambda_0)$$ [Equation 2]

where $\beta_0$ and $\beta_1$ indicate the propagation constant of the fundamental mode and the first order mode, $\lambda_0$ indicates the wavelength $n_g$ indicates the effective refractive index and $W_c$ indicates the effective width of the fundamental mode. The direct image appears when p is an even number and an inversed image appears when p is an odd number.

Therefore, if p is the odd number, the incident light from the lower optical waveguide 120 to the multimode interference coupler 130 is transmitted well to the upper optical waveguide 140 via the multimode interference coupler 130. Also, the coupling ratio of the lower optical waveguide 120 and the upper optical waveguide 140 in the optimized length can be calculated from the overlapping of the lower core layer 142 (or the upper core layer 144) against the optical waveguide 130 for the multimode interference coupler. As shown in the Equation 2, the length L of the multimode interference coupler 130 should be increased as the square of the width of the multimode interference coupler 130. It can be an obstacle to using the multimode interference coupler 130 for the vertical coupling of the multi-layer requiring sufficient separation since the errors in the alignment of respective layers during the manufacturing process induce more serious loss with the long length of the multimode interference coupler than with the shor length.

A new structure of the multimode interference coupler capable of increasing the coupling ratio with the relatively short length L of the multimode interference coupler will be described below by reference to the second and third embodiment of the present invention.

Figure 3:
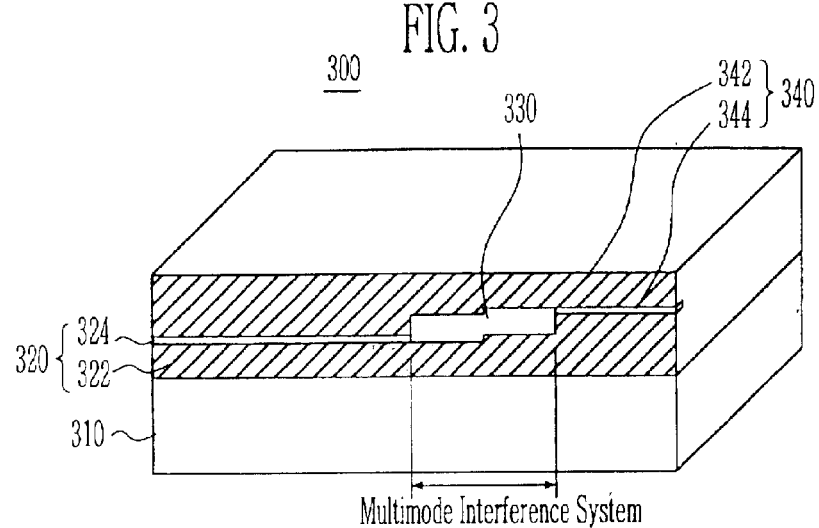
FIG. 3 is a schematic diagram of a multi-layer optical planar waveguide according to a second embodiment of the present invention.

FIG. 3 is a schematic diagram of a multi-layer optical planar waveguide according to the second embodiment of the present invention.

Referring to FIG. 3, the multi-layer optical planar waveguide 300 includes a lower optical waveguide 320 of a vertical structure on silicon or glass substrate 310, a multimode interference coupler 330 and an upper optical waveguide 340.

The lower optical waveguide 320 includes a single mode optical waveguide with clad layer 322 and 342 and a lower core layer 324. The upper optical waveguide 340 includes a single mode optical waveguide with upper clad layer 322 and 342 and an upper core layer 344.

The multimode interference coupler 330 is located between the lower optical waveguide 320 and the upper optical waveguide 340. The multimode interference coupler 330 is also connected to a specific portion between the lower optical waveguide 320 and the upper optical waveguide 340 in order to transfer light incident from the lower optical waveguide 320 to the upper optical waveguide 340. The multimode interference coupler 330, here has a single stepped structure as shown in the figure in order to increase the coupling ratio between the lower optical waveguide 320 and the upper optical waveguide 340.

Figure 4A:
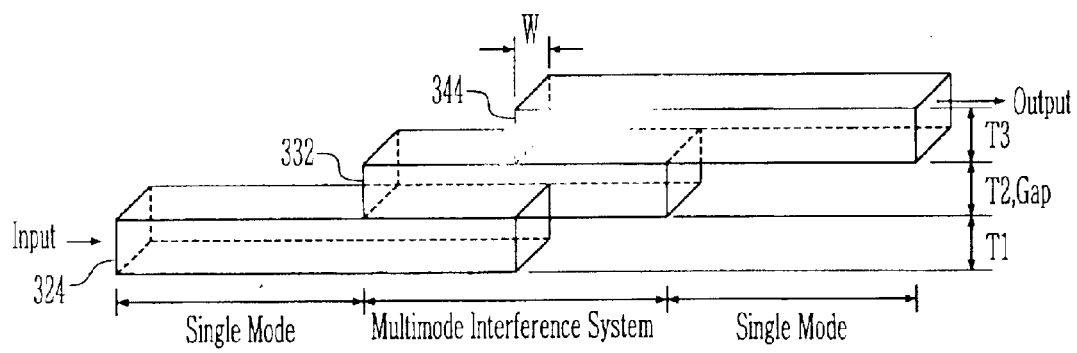
FIG. 4a and FIG. 4b are three-dimensional drawings of the multimode interference coupler shown in FIG. 3.
Figure 4B:
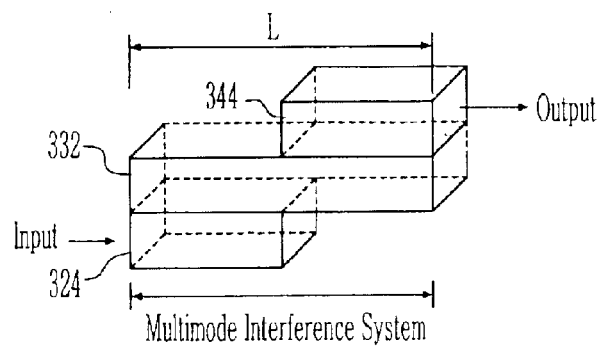

In the concrete, the multimode interference coupler 330 is located between the lower core layer 324 and the upper core layer 344, as shown in FIG. 4a and FIG. 4b. And the multimode interference coupler 330 includes an optical waveguide 332 for a multimode interference coupler connecting a portion of the lower core layer 324 and the upper core layer 344, and portion of the lower core layer 324 and the upper core layer 344 connected to the optical waveguide 332 for the multimode interference coupler.

The optical waveguide 332 for the multimode interference coupler is located between the lower core layer 324 and the upper core layer 344. A portion of the bottom surface of the optical waveguide 332 is connected to the top surface of the lower core layer 324. A portion of the top surface or the optical waveguide 332 is connected to the bottom surface of the upper core layer 344. Also, the upper core layer 344 is connected to the top surface of the optical waveguide 332 for the multimode interference coupler in order for the lower core layer 324 and the upper core layer 344 not to overlap with the optical waveguide 332 for the multimode interference coupler intervened between them. The front end of the upper core layer 344 is sequentially connected from the end of the lower core layer 324. At this time, the optical waveguide 332 for the multimode interference coupler consists of single mode or multimode optical waveguide.

As described above, the multimode interference coupler 330 includes the lower core layer 324 of the lower optical waveguide 320 being a single mode optical waveguide, the upper core layer 344 of the upper optical waveguide 340 being a single mode optical waveguide, and the optical waveguide 332 for the multimode interference coupler consisting of single mode or multimode optical waveguide. Also, the structure of the multi-mode interference coupler 330 has a stepped structure at the middle portion of its upper and lower sides in order to increase the coupling ratio between the lower optical waveguide 320 and the upper optical waveguide 340, as shown in FIG. 4b. This stepped structure can be sufficiently implemented by connecting it to the optical waveguide 332 for the multimode interference coupler so that the lower core layer 324 and the upper core layer 344 do not overlap with the optical waveguide 332 for the multimode interference coupler intervened between them.

Figure 5:
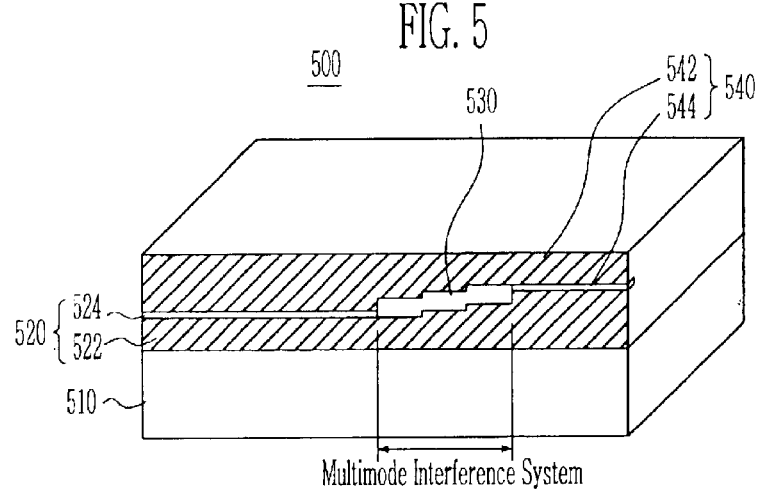
FIG. 5 is a schematic diagram of a multi-layer optical planar waveguide according to a third embodiment of the present invention.

FIG. 5 is a schematic diagram of a multi-layer optical planar waveguide according to the third embodiment of the present invention.

Referring now to FIG. 5, the multi-layer optical planar waveguide 500 includes a lower optical waveguide 520 which is vertically formed on silicon or glass substrate 510, a multimode interference coupler 530 and an upper optical waveguide 540.

The lower optical waveguide 520 includes a single mode optical waveguide having a lower clad layer 522 and a lower core layer 524. The upper optical waveguide 540 includes a single mode optical waveguide having an upper clad layer 542 and an upper core layer 544.

The multimode interference coupler 530 is located between the lower optical waveguide 520 and the upper optical waveguide 540. The multimode interference coupler 530 is also connected to a specific portion between the lower optical waveguide 520 and the upper optical waveguide 540 in order to transfer light incident from the lower optical waveguide 520 to the upper optical waveguide 540. Also, the multimode interference coupler 530 has a single stepped structure on its upper and lower portions in order to increase the coupling ratio between the lower optical waveguide 520 and the upper optical waveguide 540.

Figure 6A:
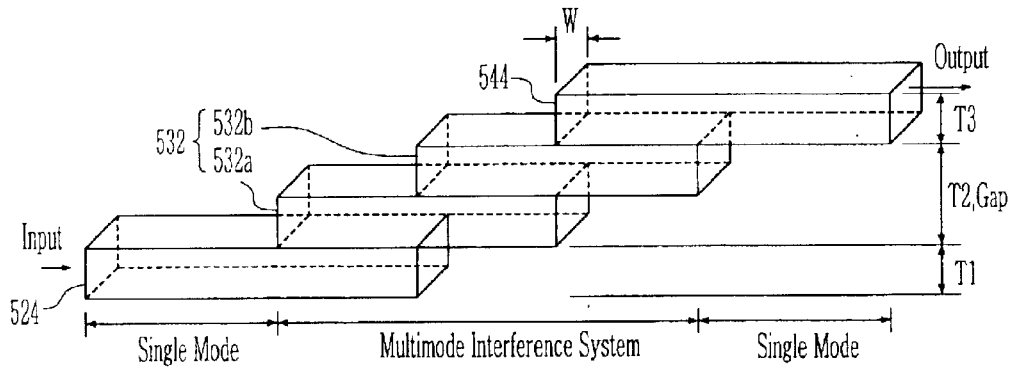
FIG. 6a and FIG. 6b are three-dimensional drawings of the multimode interference coupler shown in FIG. 5.
Figure 6B:
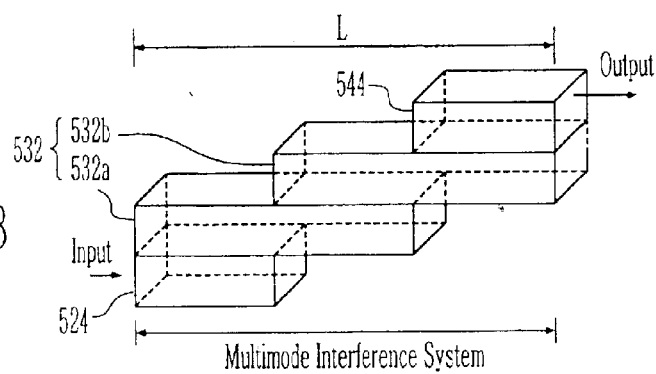

In the concrete, the multimode interference coupler 530 is located between the lower core layer 524 and the upper core layer 544, as shown in FIG. 6a and FIG. 6b. And the multimode interference coupler 530 includes two layers of optical waveguides 532a and 532b for a multimode interference coupler each of which connects a portion of the lower core layer 524 and the upper core layer 544, and portions of the lower core layer 524 and the upper core layer 544 each of which connects a portion of the optical waveguide 532a and 532b for the multimode interference coupler. The optical waveguide 532a for the multimode interference coupler is located between the lower core layer 524 and the optical waveguide 532b for the multimode interference coupler. A portion of the bottom surface of the optical waveguide 532a for the multimode interference coupler is connected to the top surface of the lower core layer 524. Also, a portion of the top surface of the optical waveguide 532a for the multimode interference coupler is connected to the bottom surface of the optical waveguide 532b for the multimode interference coupler. The optical waveguide 532b for the multimode interference coupler is located between the optical waveguide 532a for the multimode interference coupler and the upper core layer 544. A portion of the bottom surface of the optical waveguide 532b for the multimode interference coupler is connected to the top surface of the optical waveguide 532a for the multimode interference coupler. A portion of the top surface of the optical waveguide 532b for the multimode interference coupler is connected to the bottom surface of the upper core layer 544. Further, the optical waveguide 532b for the multimode interference coupler does not overlap with the lower core layer 524 with the optical waveguide 532a for the multimode interference coupler intervened between them. The upper core layer 544 does not overlap with the optical waveguide 532a for the multimode interference coupler with the optical waveguide 532b for the multimode interference coupler intervened between them. The upper core layer 544 does not overlap with the lower core layer 524 with the optical waveguides 532a and 532b for the multimode interference coupler intervened between them. At this time, the optical waveguides 532a and 532b for the multimode interference coupler consist of single mode or multimode optical waveguide.

As described above, the multimode interference coupler 530 includes the lower core layer 524 of the lower optical waveguide 520 being a single mode optical waveguide, the upper core layer 544 of the upper optical waveguide 540 being a single mode optical waveguide, and the optical waveguides 532a and 532b for the multimode interference coupler consisting of single mode or multimode optical waveguides. Also, the structure of the multimode interference coupler 530 has two stepped structures at the middle portion of its upper and lower sides in order to increase the coupling ratio between the lower optical waveguide 520 and the upper optical waveguide 540, as shown in FIG. 6b. This stepped structure can be sufficiently implemented by connecting it to the optical waveguides 532a and 532b for the multimode interference coupler so that the lower core layer 524 and the upper core layer 544 do not overlap with the optical waveguides 532a and 532b for the multimode interference coupler intervened between them.

Variation in the coupling ratio between the upper/lower optical waveguides for each MMI length (mm) depending on respective embodiments (the first, the second and the third embodiments) will be described by reference to FIG. 7~FIG. 15.

FIG. 7~FIG. 15 shows results of computer-simulated variations in the coupling ratio for the MMI length (mm) in each of the embodiments. In the simulation condition, it is assumed that the refractive index of the core layers on upper/lower optical waveguides is 1.505, the refractive index of the clad layers on the upper/lower optical waveguides is 1.5, the heights T1 and T2 and the width W of the basic optical waveguide on the upper/lower optical waveguide has a rectangular structure of 6 $\mu$m, and the wavelength is 1.55 $\mu$m usually used in optical communications.

Figure 7:
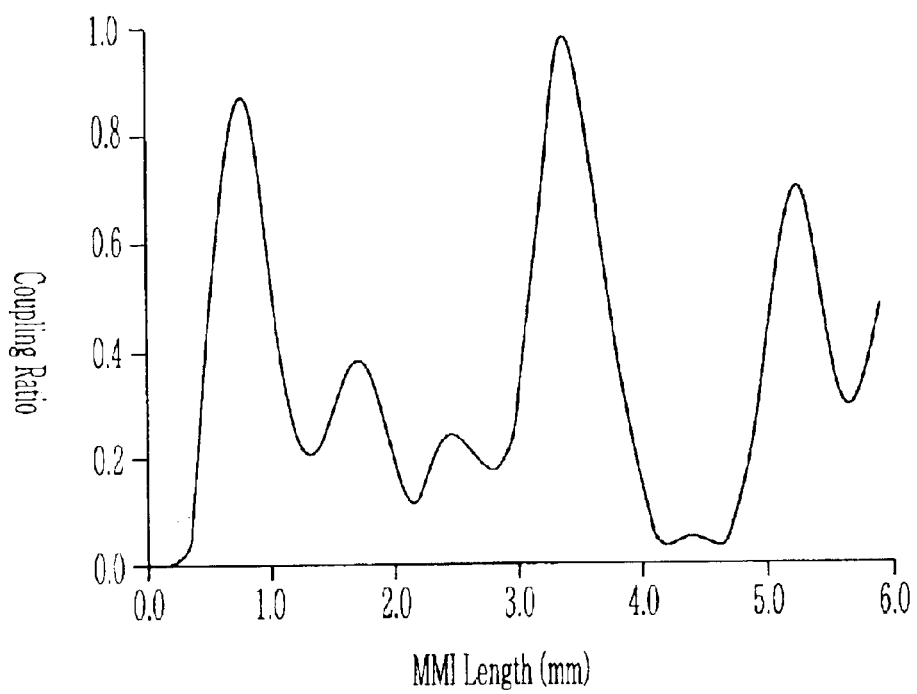
FIG. 7, FIG. 10 and FIG. 13 are graphs illustrating a result of simulating variations in the coupling ratio against the MMI length according to the first embodiment of the present invention.
Figure 8:
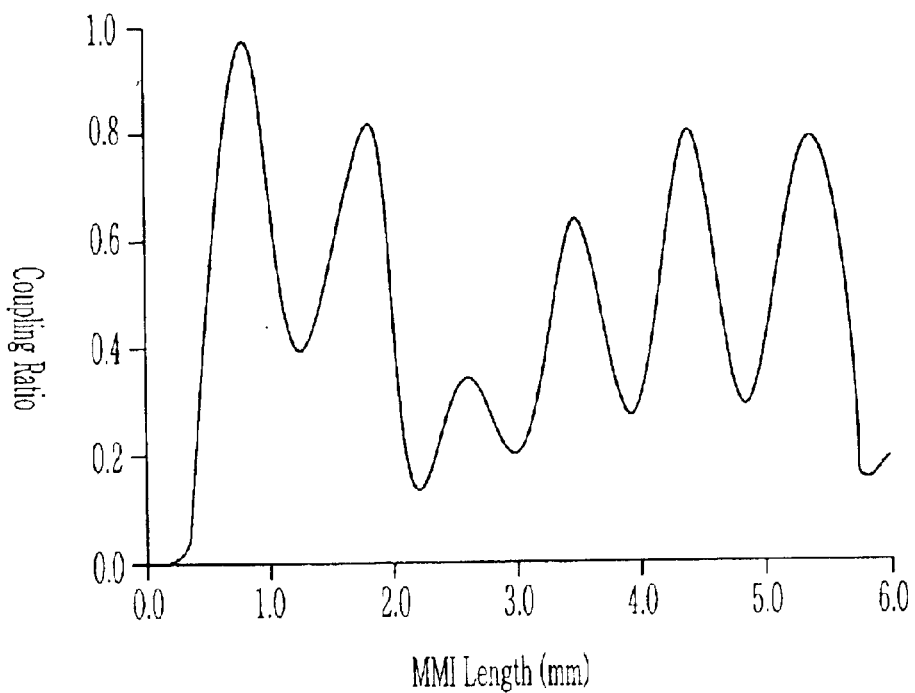
FIG. 8, FIG. 11 and FIG. 14 are graphs illustrating a result of simulating variations in the coupling ratio against the MMI length according to the second embodiment of the present invention.
Figure 9:
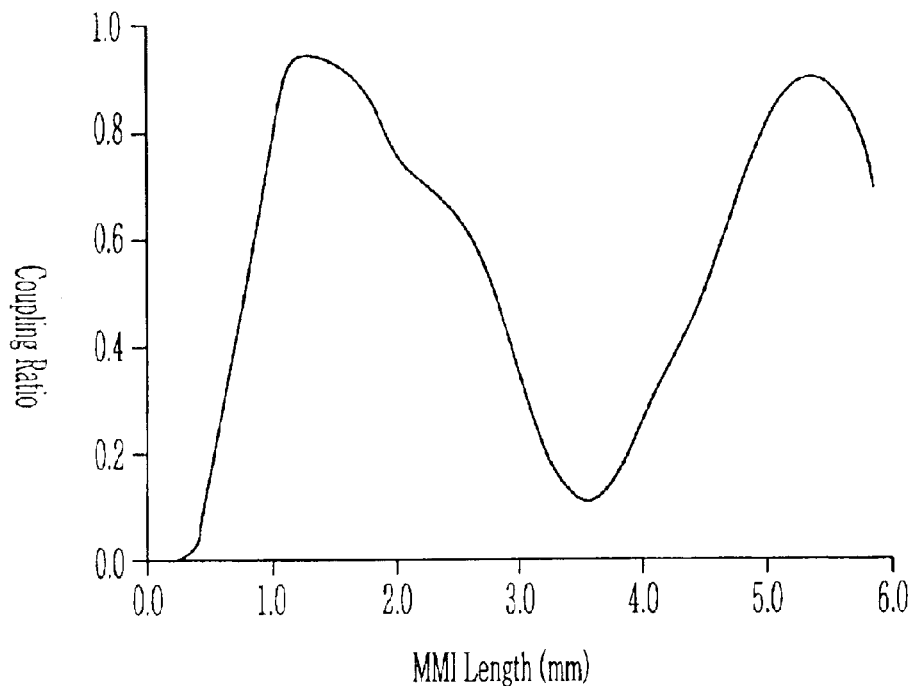
FIG. 9, FIG. 12 and FIG. 15 are graphs illustrating a result of simulating variations in the coupling ratio against the MMI length according to the third embodiment of the present invention.

FIG. 7~FIG. 9 show computer simulation when the gap between the upper/lower optical waveguides, that is the thickness T2 of the optical waveguides 120, 220 and 320 for each of the multimode interference couplers is 12 $\mu$l. FIG. 7 is a computer simulation showing variation in the coupling ratio for the coupling length of the multimode interference coupler according to the first embodiment of the present invention. FIG. 8 is a computer simulation showing variation in the coupling ratio for the coupling length of the multimode interference coupler according to the second embodiment of the present invention. FIG. 9 is a computer simulation showing variation in the coupling ratio for the coupling length of the multimode interference coupler according to the third embodiment of the present invention.

As shown in FIG. 7~FIG. 9, it can be seen that the coupling ratio between the upper/lower optical waveguide is significantly varied depending on the coupling length of the multimode interference coupler in respective embodiments. In particular, it can be seen that the maximum coupling ratio is about 93% in case of FIG. 9. Further, it can be seen that in case of FIGS. 8 and 9, the coupling length of the multimode interference coupler for obtaining the maximum coupling ratio is shortened compared to FIG. 7.

In concrete, it can be seen that in case of FIG. 7, the coupling length of the multimode interference coupler for obtaining the maximum coupling ratio is about 3.55 mm while in case of FIG. 8, the coupling length of the multimode interference coupler for obtaining the maximum coupling ratio is about 0.85 unit and in case of FIG. 9, the coupling length of the multimode interference coupler for obtaining the maximum coupling ratio is about 1.2 mm. Further, in case of FIG. 9, the dependence of the coupling ratio on the coupling length of the multimode interference coupler is significantly reduced. Thus, a stable coupling between the upper/lower layers optical waveguides can be maintained. Based on this fact, if the multimode interference couplers having stepped structure according to the second and third embodiments of the present invention is employed, it can obtain a coupling ratio that is stable in variations of the coupling length compared to the multimode interference coupler according to the first embodiment of the present invention.

Figure 10:
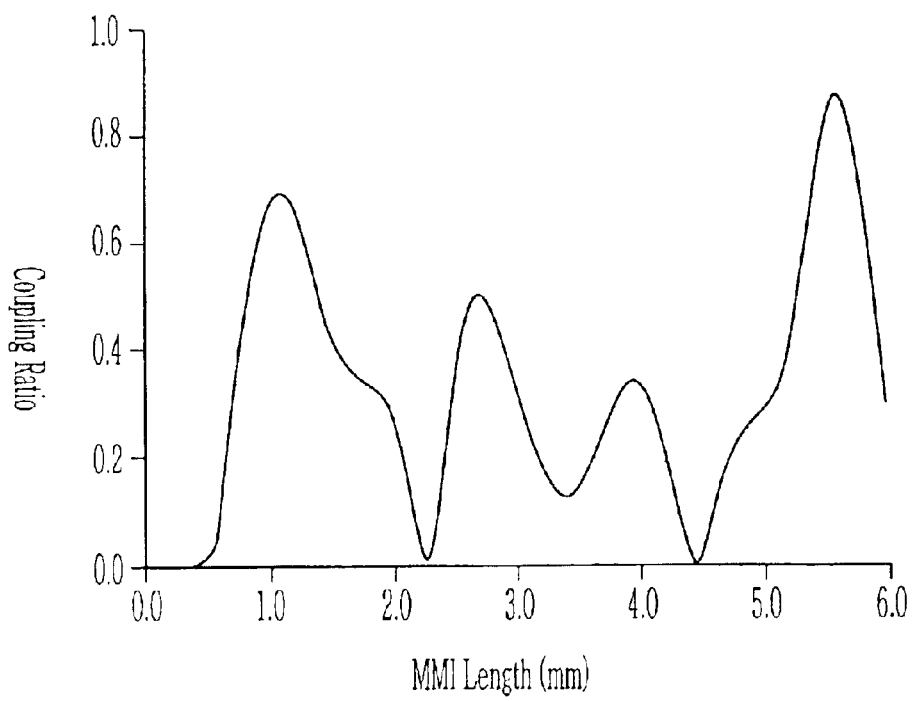
Figure 11:
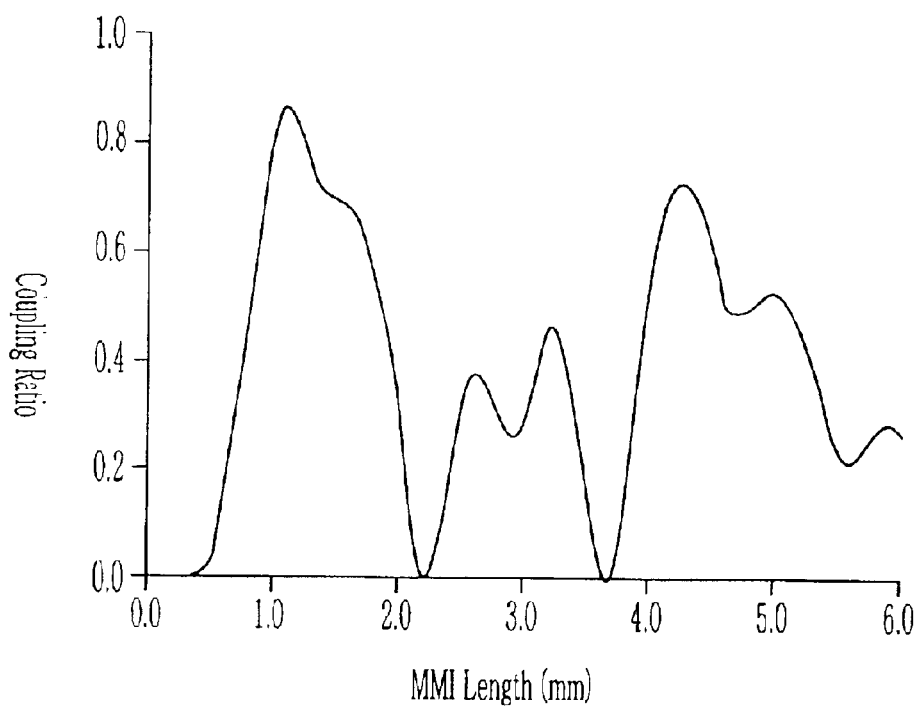
Figure 12:
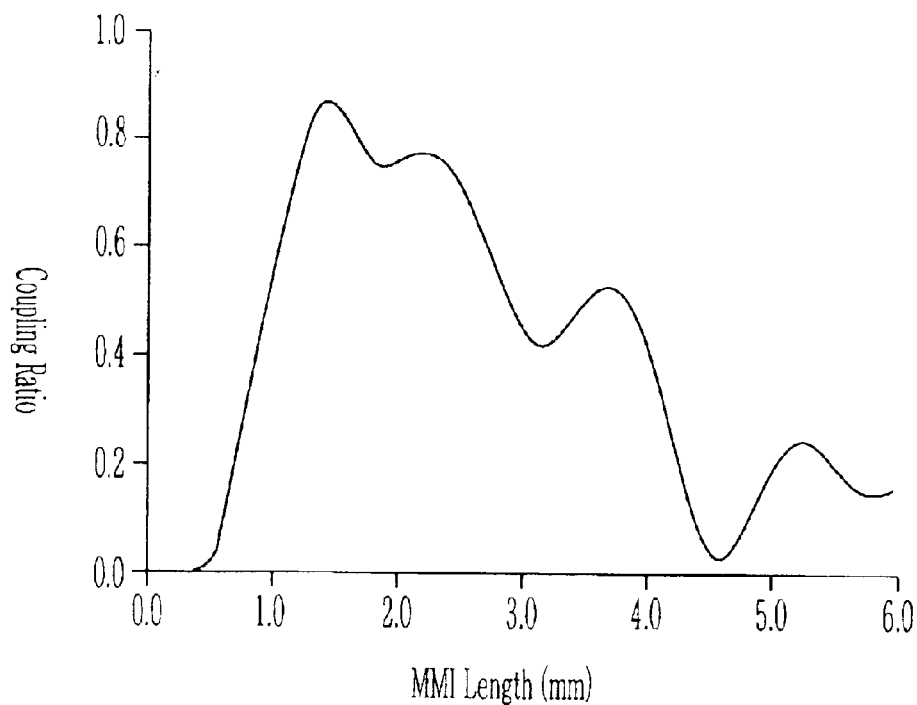

Meanwhile, FIG. 10~FIG. 12 show computer simulation when the gap between the upper/lower optical waveguides, that is the thickness T2 of each optical waveguides 120, 220 and 320 for the multimode interference couplers is 20 $\mu$m. FIG. 10 is a computer simulation showing variation in the coupling ratio for the coupling length of the multimode interference coupler according to the first embodiment of the present invention. FIG. 11 is a computer simulation showing the variation in the coupling ratio for the coupling length of the multimode interference coupler according to the second embodiment of the present invention. FIG. 12 is a computer simulation showing variation in the coupling ratio for the coupling length of the multimode interference coupler according to the third embodiment of the present invention.

As shown in FIG. 10~FIG. 12, it can be seen that the coupling ratio between the upper/lower optical waveguide is significantly varied depending on the coupling length of the multimode interference. In particular, it can be seen that the maximum coupling ratio is about 86% in case of FIG. 12. Further, it can be seen that in case of FIG. 11 and FIG. 12, the coupling length of the multimode interference coupler for obtaining the maximum coupling ratio is shorten compared to FIG. 10.

In concrete, it can be seen that in case of FIG. 10, the coupling length of the multimode interference coupler for obtaining the maximum coupling ratio is about 5.65 mm while in case of FIG. 11, the coupling length of the multimode interference coupler for obtaining the maximum coupling ratio is about 1.1 mm and in case of FIG. 12, the coupling length of the multimode interference coupler for obtaining the maximum coupling ratio is about 1.4 mm. Further, in case of FIG. 12, the dependence of the coupling ratio on the coupling length of the multimode interference coupler is significantly reduced. Thus, a stable coupling between the optical waveguides on the upper/lower layers can be maintained. Based on this fact, if the multimode interference couplers having stepped structure according to the second and third embodiments of the present invention is employed, it can obtain a coupling ratio that is stable in variations of the coupling length compared to the multimode interference coupler according to the first embodiment of the present invention.

Figure 13:
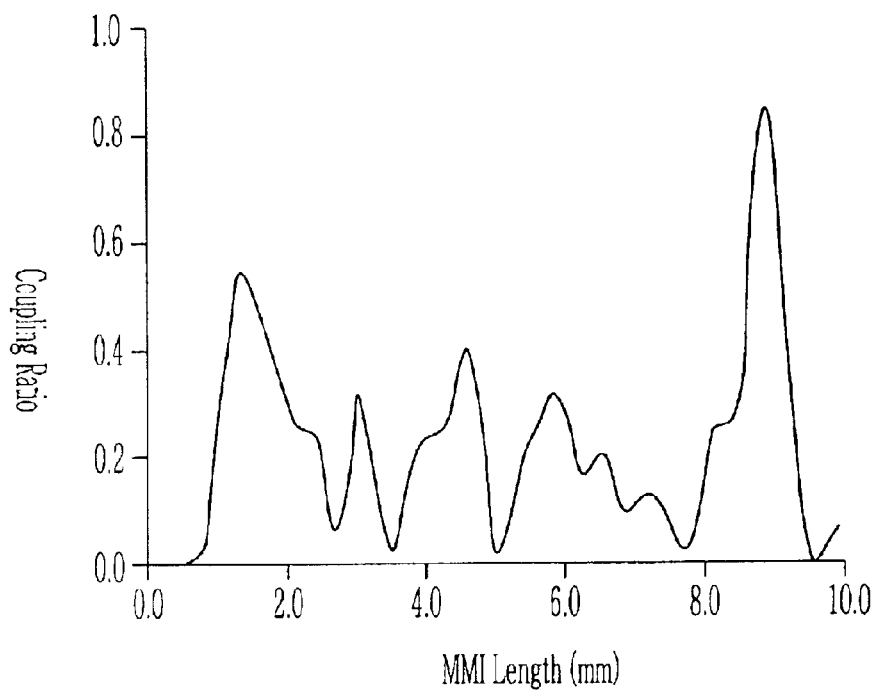
Figure 14:
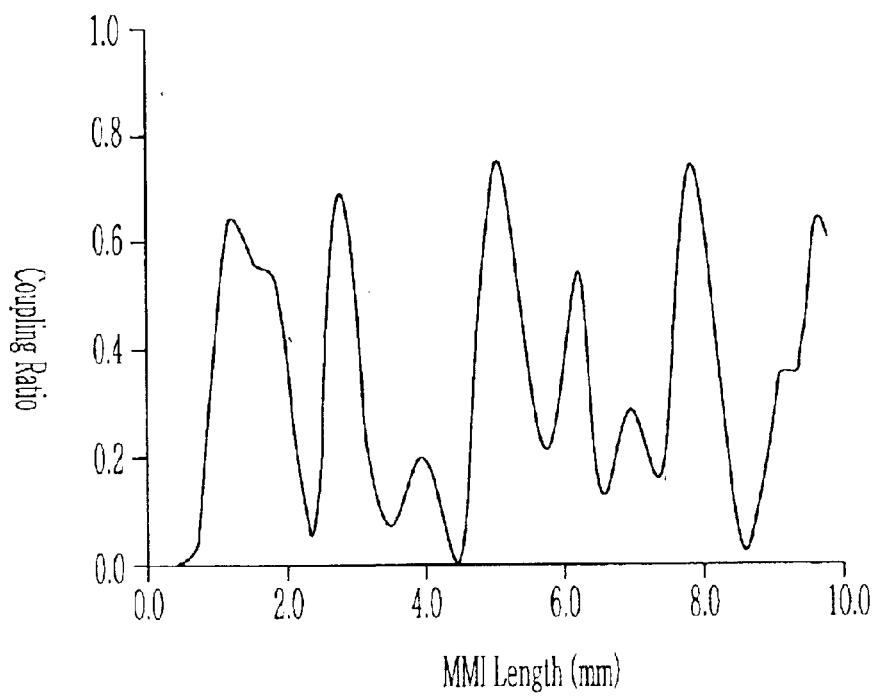
Figure 15:
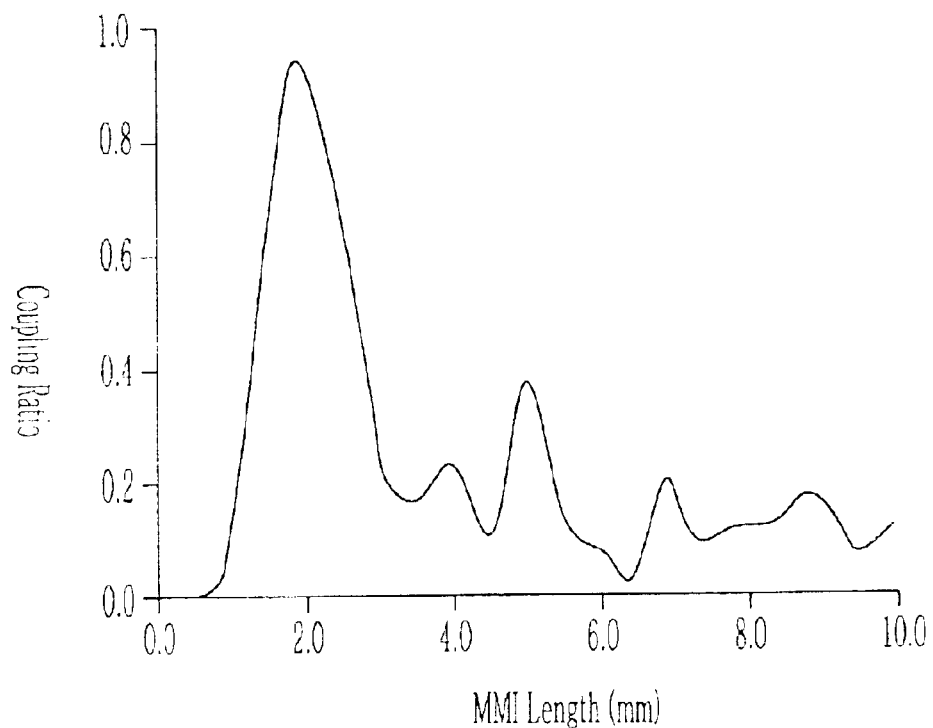

Meanwhile, FIG. 13 FIG. 15 show computer simulation when the gap between the upper/lower optical waveguides, that is the thickness T2 of each optical waveguides 120, 220 and 320 for the multimode interference couplers is 30 $\mu$m. FIG. 13 is a computer simulation showing variation in the coupling ratio for the coupling length of the multimode interference coupler according to the first embodiment of the present invention. FIG. 14 is a computer simulation showing variation in the coupling ratio for the coupling length of the multimode interference coupler according to the second embodiment of the present invention. FIG. 15 is a computer simulation showing variation in the coupling ratio for the coupling length of the multimode interference coupler according to the third embodiment of the present invention.

As shown in FIG. 13~FIG. 15, it can be seen that the coupling ratio between the upper/lower optical waveguide is significantly varied depending on the coupling length of the multimode interference coupler in respective embodiments. In particular, in case of the multimode interference coupler having two-stepped structure as in case of FIG. 15, the maximum coupling ratio is about 92% when the coupling length of the multimode interference coupler is 1.85 mm. Further, in case of the multimode interference coupler having a simple structure as in FIG. 13, the maximum coupling ratio is about 83% when the coupling length of the multimode interference coupler is 9 mm. On the contrary, in case of the multimode interference coupler having a single stepped structure as in FIG. 14, the maximum coupling ratio is about 71% when the coupling length of the multimode interference coupler is 5.2 mm. Based on this fact, it can be seen that when the thickness of the clad layer between the upper/lower layers optical waveguides is 30 µm, it has an outstanding effect in view of the coupling length and coupling ratio of the multimode interference coupler having two stepped structure compared to a multimode interference coupler having other structure.

Figure 16:
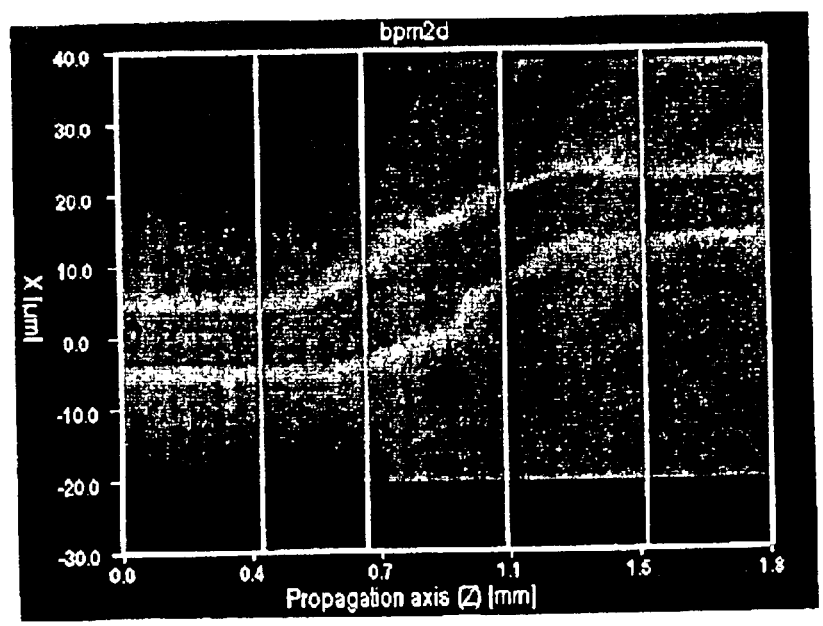
FIG. 16~FIG. 18 illustrate results of computer-simulating optical progress using a beam propagation method (BPM) in FIG. 8, FIG. 11 and FIG. 15.
Figure 17:
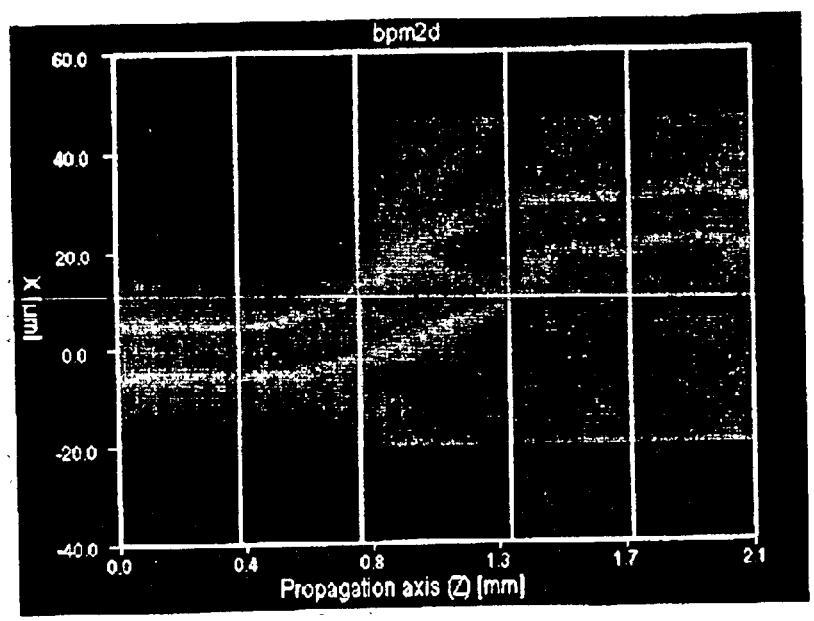
Figure 18:
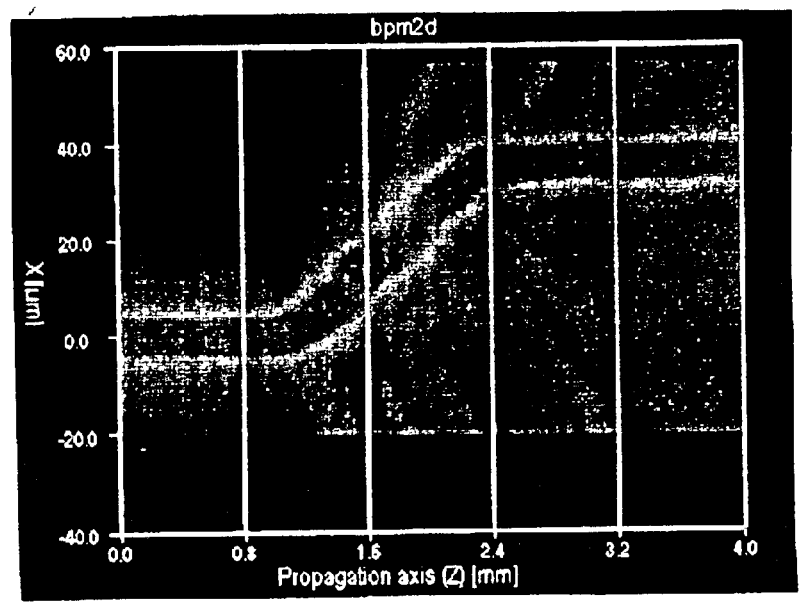

As described above, the maximum coupling ratio can be obtained depending on the shortest coupling length in FIGS. 8, 11 and 15. The light propagation between the optical waveguides on the upper/lower layers is simulated using beam propagation method (BPM) can be shown in FIG. 16~FIG. 18~FIG. 16 is a result of computer-simulation corresponding to that of FIG. 8~FIG. 17 is a result of computer-simulation corresponding to that of FIG. 11, and FIG. 18 is a result of computer-simulation corresponding to that of FIG. 15. From FIG. 16~FIG. 18, it can be seen that light is propagated with incline from the lower optical waveguide to the upper optical waveguide through respective multimode interference couplers and coupled.

A method of manufacturing a multi-layer optical planar waveguide having a multimode interference coupler of a single stepped structure according to the second embodiment of the present invention will be below described. At this time, it should be noted that a method of manufacturing the multi-layer optical planar waveguide according to other embodiments (first and second embodiments) of the present invention are equivalent to the method according to the second embodiment.

FIG. 19a~FIG. 19g are cross-sectional views of a multi-layer optical planar waveguide for describing a method of manufacturing the same according to a fourth embodiment of the present invention.

Figure 19A:
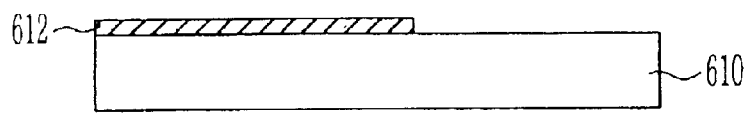
FIG. 19a~FIG. 19g are cross-sectional views of a multi-layer optical planar waveguide for describing a method of manufacturing the same according to a fourth embodiment of the present invention.

Referring now to FIG. 19a, a core is coated on silicon or glass substrate 610. A portion of the core is patterned through exposure and etching process using photolithography process to form a lower core layer 612 on a portion of the glass substrate 610.

Figure 19B:
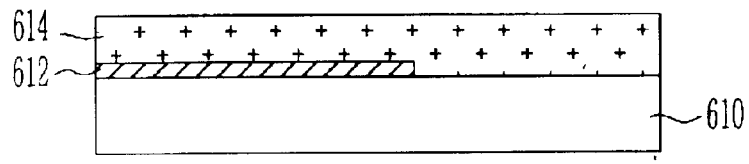

Referring now to FIG. 19b, a clad 614 is formed on the entire structure including the lower core layer 612.

Figure 19C:
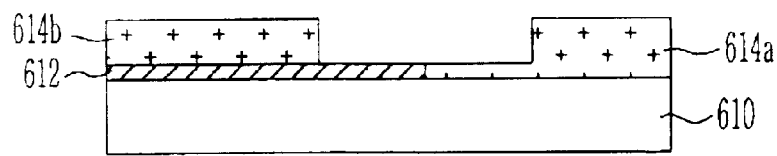

By reference to FIG. 19c, the clad 614 (see FIG. 19b) at a portion where a multimode interference coupler will be formed is etched through exposure and etching process to form a lower clad layer 614a. Meanwhile, a clad layer 614b that will become a portion of the upper clad layer 618 is formed on the lower core layer 612.

Figure 19D:
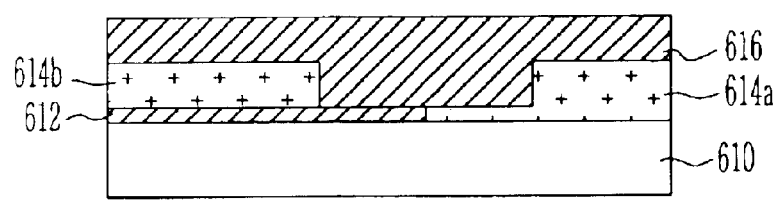

Referring now to FIG. 19d, a core 616 is coated on the entire structure including the lower clad layer 614a and the clad layer. Thereby, an empty gap between the lower clad layer 614a and the clad layer 614b is filled with the core 616.

Figure 19E:
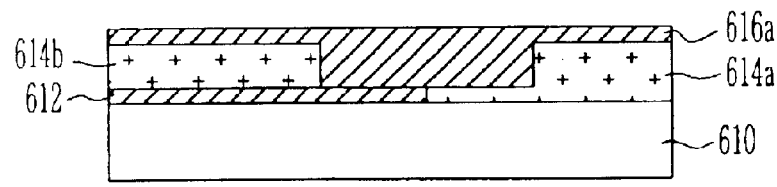

By reference to FIG. 19e, when the core 616 is coated, in FIG. 19d, in case that flattening of the top surface of the core 616 is not facilitated due to the step between the lower clad layer 614a and the lower core layer 612, the clad layer is formed thick enough to flatten the top surface of the core 616. Next, a etching process is formed in a desired thickness or a polishing process (for example, chemical mechanical polishing (CMP)) may be performed. If a core material having a high fluidity is used, the etching process or the polishing process may be skipped. At this time, it can be seen that the core 616a is flattened by the etching process or the polishing process.

In another way, the step from (b) to (e) can be achieved as follows. At first, the clad 614 layer of is etched down to the top of the lower core 612 and then core material is coated on it. Next, the core layer is selectively etched down to the top of the lower core 612 except the portion of MMI region and then the clad material is coated on it. Next, the clad layer is etched down again to the top of MMI layer and the core material is coated on it.

Figure 19F:
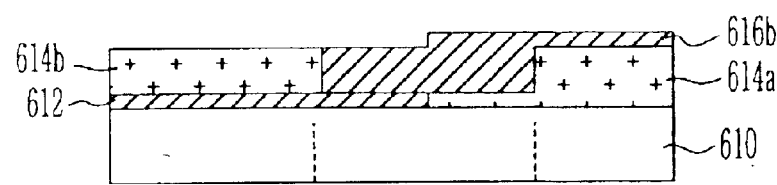

Referring now to FIG. 19f, an upper side of the clad layer 614b is exposed through exposure and etching process using photolithography process. At the same time, the core 616a at a portion corresponding to the lower core layer 612 is etched up to the boundary where the lower core layer 612 and the lower clad layer 614a are connected. Thereby, a multimode interference coupler that is a single stepped structure at the portion where the lower core layer 612 and the lower clad layer 614a correspond, that is the center of the upper side of the clad layer 614b is formed. At the same time, the upper core layer 616b is formed on the lower clad layer 614a. At this time, the multimode interference coupler is formed to be thicker than the lower core layer 612 and the upper core layer 616b.

Figure 19G:
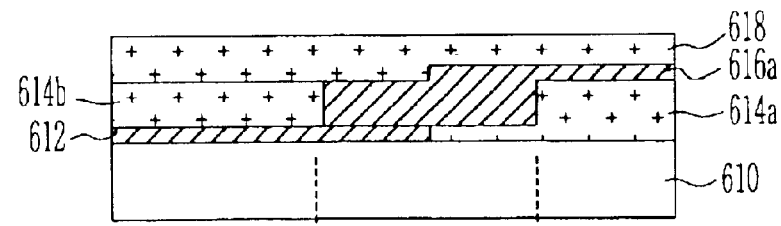

Referring now to FIG. 19g, a clad that will become an upper clad layer 618 along with the clad layer 614b is coated on the entire surface of the structure. Thereby, a multi-layer optical planar waveguide that consists or a lower optical waveguide having the lower core layer 612 and the lower clad layer 614a on the glass substrate 610, a upper optical waveguide having the upper core layer 614b and the upper clad layer 618, and a multimode interference coupler of a single stepped structure formed between the lower optical waveguide and the upper optical waveguide.

Meanwhile, the optical waveguide according to the firth embodiment of the present invention may be made of glass, polymer, various semiconductor materials, etc. A similar one to the multi-layer optical planar waveguide includes method of manufacturing a multi-layer optical planar waveguide in which an ion-exchanged glass waveguide of a buried type disclosed in "Ion-Exchanged Glass Waveguide: a Review" in J. Lightwave Technol, by R. V. Ramaswamy, et al (1998) is used as a lower optical waveguide and a waveguide made of polymer is used as an upper optical waveguide.

FIG. 20a~FIG. 20f are the cross-sectional views of a multi-layer optical planar waveguide for describing a method of the waveguide according to a fifth embodiment of the present invention, and FIG. 21a~FIG. 21f show cross-sectional views of the waveguide that is rotated by 90° in FIG. 20a~FIG. 20f.

Figure 20A:
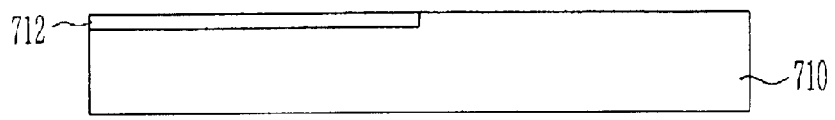
FIG. 20a~FIG. 20f are the cross-sectional views of a multi-layer optical planar waveguide for describing a method of manufacturing the same according to a fifth embodiment of the present invention.
Figure 21A:
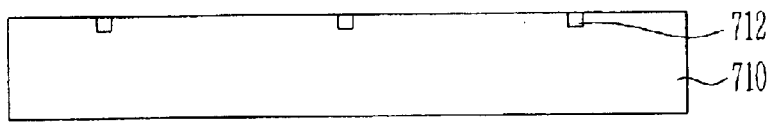
FIG. 21a~FIG. 21f show cross-sectional views of the waveguide that is rotated by 90° in FIG. 20a FIG. 20f.

Referring now to FIG. 20a and FIG. 21a, a lower core layer 712 is formed at a portion of a glass substrate 710 using an ion exchange method. A method of manufacturing the lower core layer 712 using the ion exchange method is described in FIG. 22. As shown in FIG. 22, a metal mask 700 is located on the glass substrate 710 made by melting atoms the composition of which is adjusted. The metal mask 700 is immersed into a fused salt 702 (i.e., nitride salt) fused at a given temperature (i.e., 300~500° C.) to form a lower core layer 712 using the difference in the refractive index through the diffusion of atoms within the glass substrate 710 and the fused salt 702.

Figure 20B:
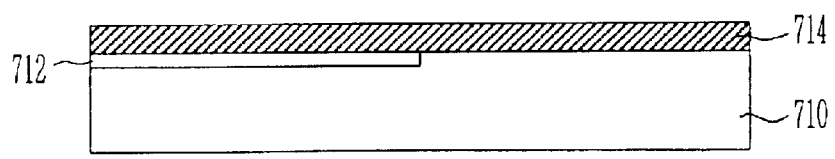
Figure 21B:
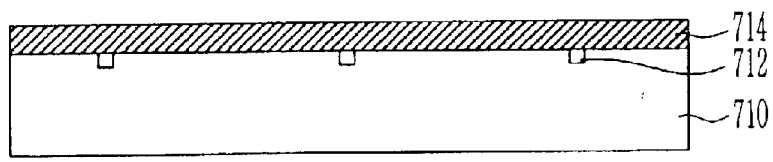

Referring now to FIG. 20b and FIG. 21b, an UV photosensitive polymer 714 the refractive index of which is varied by an UV light is coated on the entire structure including the lower core layer 712.

Figure 20C:
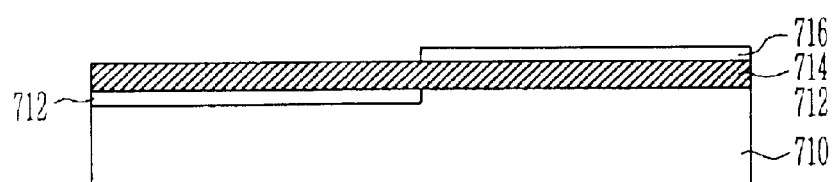
Figure 21C:
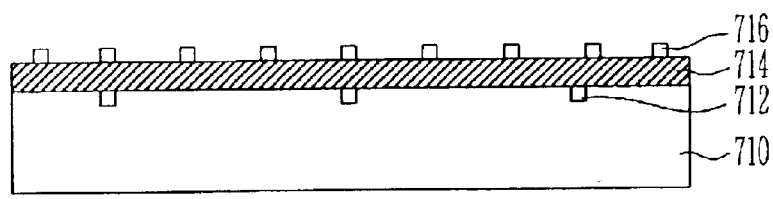

By reference to FIG. 20c and FIG. 21c, polymer is coated on the UV photosensitive polymer 714. A part of the polymer is patterned by means of exposure and etching process using a photolithography process to form an upper core layer 716. At this time, it is preferred that the refractive index of the UV photosensitive polymer 714 is varied a little when weak or short UV light is exposed during the exposure process but is greatly varied when the UV light is exposed for a long time.

Figure 20D:
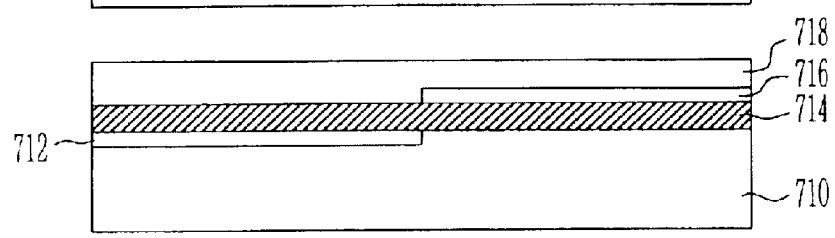
Figure 21D:
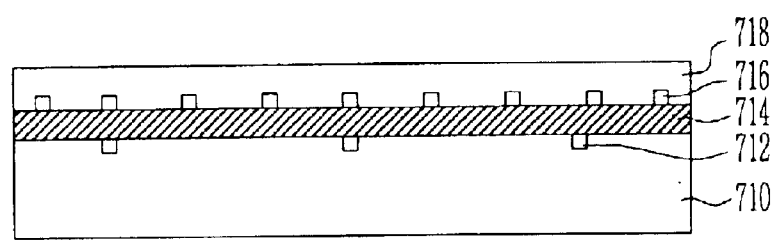

Referring now to FIG. 20d and FIG. 21d, polymer is coated on the entire structure including the upper core layer 716 to form an upper clad layer 718. It is preferred that the refractive index of the polymer used as the upper clad layer 718 is not changed by the UV light.

Figure 20E:
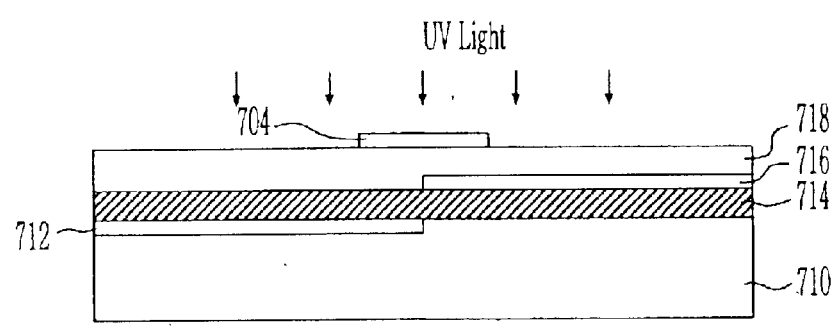
Figure 20F:
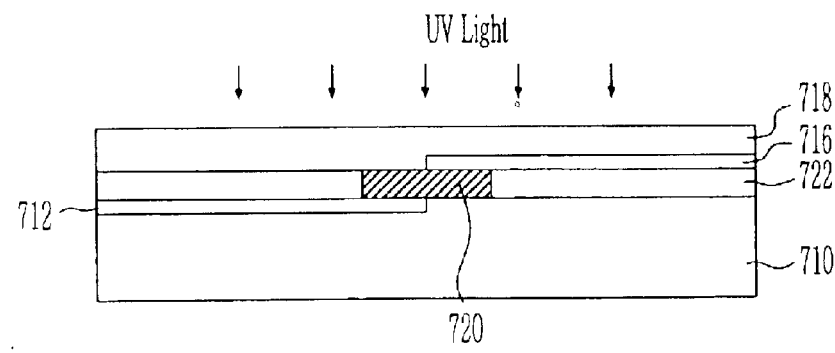
Figure 21E:
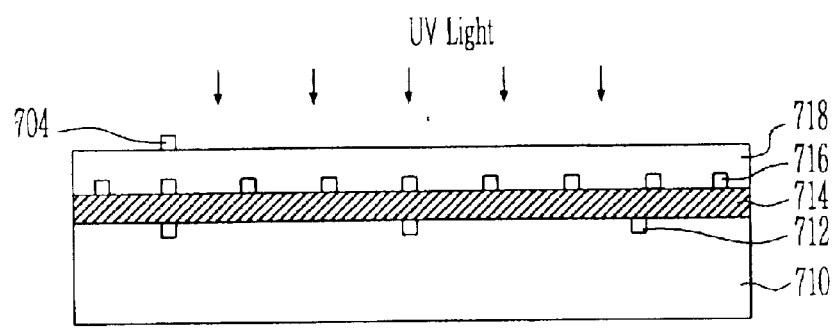

Referring now to FIG. 20e and FIG. 21e, a metal mask 704 is located on the upper clad layer 718 corresponding to a region where a multimode interference coupler 720 (see FIG. 20f and FIG. 21f) will be formed and is then illuminated by an UV light.

Figure 21F:
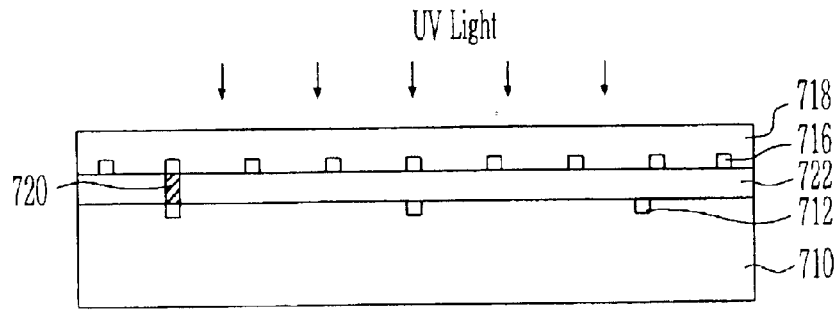
Figure 22A:
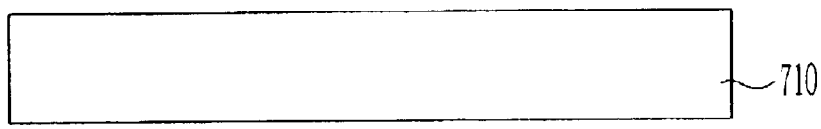
Figure 22B:
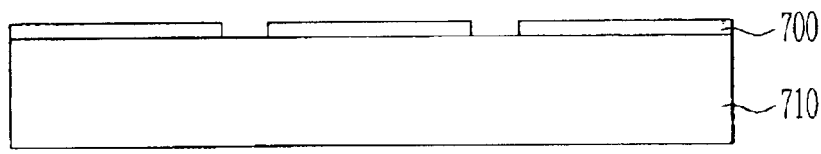
Figure 22C:
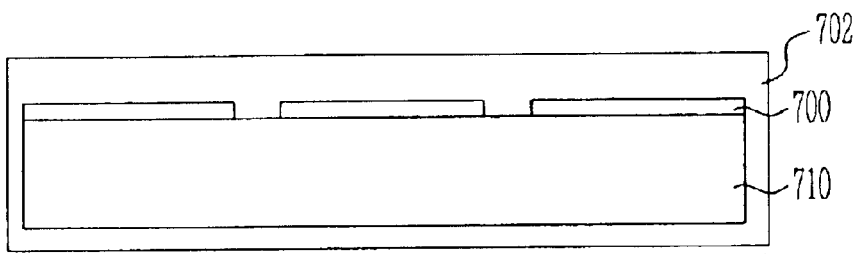
Figure 22D:
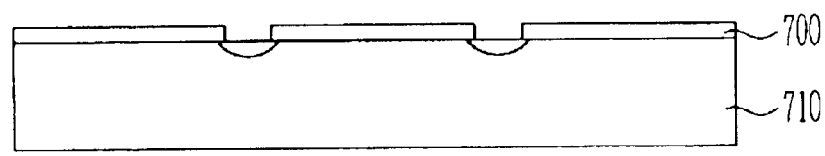
Figure 22E:
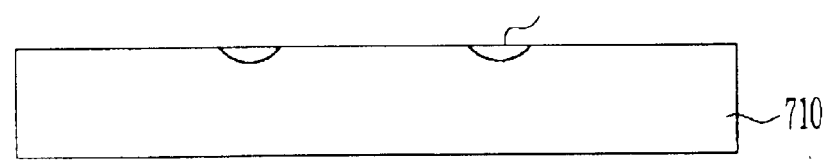

By reference to FIG. 20f and FIG. 21f, the refractive index of a portion exposed by the UV light among the photosensitive polymer 714 in FIG. 20e and FIG. 21e is changed (for example, changed to a low refractive index) while the refractive index of a portion in which the UV light is shielded by the metal mask 704 is not changed. Therefore, a portion that does not overlap with the top of the lower core layer 712 among portion the refractive index of the UV photosensitive polymer 714 is changed, becomes a lower clad layer 722. Also, a portion that overlaps with the top of the lower core layer 712 is included in the upper clad layer 718 so that it becomes a clad layer of the upper optical waveguide. Meanwhile, a portion that is not directly exposed to the UV light among the UV photosensitive polymer 714, becomes the multimode interference coupler 720. At this time, the multimode interference coupler 720 is formed to be thicker than the lower core layer 712 and the upper core layer 716.

Through the above steps, the multi-layer optical planar waveguide including a lower optical waveguide having the lower core layer 712 and the lower clad layer 722 on the glass substrate 710, an upper optical waveguide having the upper core layer 716 and the upper clad layer 718, and a multimode interference coupler 720 of a single stepped structure formed between the lower optical waveguide and the upper optical waveguide, is formed.

As mentioned above, according to the present invention, a multimode interference coupler of a stepped structure having a high coupling ratio is formed between upper and lower optical waveguides. Therefore, the present invention has outstanding advantages that it can implement a multimode interference coupler of a stepped structure having a high coupling ratio while reducing evanescent field interference between the upper and lower optical waveguides.

Further, the present invention can significantly improve the degree of integration of a optical planar waveguide device by implementing a multi-layer optical planar waveguide of a vertical structure.

In the above embodiments, an explanation is made only on the optical planar waveguide of a two layer structure having upper and lower optical waveguides for convenience of explanation. However, it should be noted that it is not intended to limit the scope of the present invention. In other words, it will be apparent to those having ordinary skill in the art that various embodiments for implementing a multilayer optical planar waveguide such as a optical planar waveguide of three, four, five, six layers, etc. are possible within the scope of the present invention.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A multimode interference coupler, comprising:
   an optical waveguide for a multimode interference coupler formed between a lower optical waveguide and an upper optical waveguide so that the lower optical waveguide and the upper optical waveguide can be vertically connected,
   wherein the thickness of the optical waveguide for the multimode interference coupler is larger than each of the optical waveguides to reduce the interference between the lower optical waveguide and the upper optical waveguide.

2. The multimode interference coupler as claimed in claim 1, wherein a portion of the bottom surface of the optical waveguide for the multimode interference coupler is connected to the top surface of the lower optical waveguide, and a portion of the top surface of the optical waveguide for the multimode interference coupler is connected to the bottom surface of the upper optical waveguide.

3. The multimode interference coupler as claimed in claim 2, wherein the optical waveguide of the multi-mode interference coupler and the upper optical waveguide are connected in a sequential stepped structure on the top surface of the lower optical waveguide.

4. The multimode interference coupler as claimed in claim 3, wherein the upper optical waveguide is connected to the top surface of the optical waveguide for the multimode interference coupler, and wherein the starting portion of the upper optical waveguide is positioned at the ending portion of the lower optical waveguide.

5. The multimode interference coupler as claimed in claim 1 wherein the optical waveguide for the multimode interference coupler comprises;
   an optical waveguide for a lower multimode interference coupler the bottom surface of which is connected to the top surface of the lower optical waveguide, and
   an optical waveguide for the upper multimode interference coupler the bottom surface of which is connected to the top surface of the lower multimode interference coupler and the top surface of which is connected to the bottom surface of the upper optical waveguide.

6. The multimode interference coupler as claimed in claim 5, wherein the bottom surface of the optical waveguide for the upper multimode interference coupler is connected to the top surface of the optical waveguide for the lower multimode interference coupler and the front end of the optical waveguide for the upper multimode interference coupler is positioned at the ending portion of the lower optical waveguide.

7. The multimode interference coupler as claimed in claim 5, wherein the bottom surface of the upper optical waveguide is connected to the top surface of the optical waveguide for the upper multimode interference coupler and the starting portion of the upper optical waveguide device is positioned at the ending portion of the optical waveguide for the lower multimode interference coupler.

8. The multimode interference coupler as claimed in claim 1, wherein the bottom surface of said optical waveguide for the multimode interference coupler is connected to the top surface of the lower optical waveguide, and the top surface of said optical waveguide for the multimode interference coupler is connected to the bottom surface of the upper optical waveguide.

9. The multimode interference coupler as claimed in claim 8, wherein the lower optical waveguide and the upper optical waveguide are partially overlapped each other with the optical waveguide for the multimode interference coupler intervened between them.

10. A multi-layer optical planar waveguide, comprising:
   a lower optical waveguide;
   an upper optical waveguide located to form a vertical structure with the lower optical waveguide; and
   a multimode interference coupler according to claim 1 in order to connect the lower optical waveguide and the upper optical waveguide.

11. The multi-layer optical planar waveguide as claimed in claim 10, wherein the multimode interference coupler is formed to be the same material to the lower optical waveguide or the upper optical waveguide.

12. The multimode interference coupler as claimed in claim 1, wherein at least two of the optical waveguides for the multimode interference coupler are connected to form a sequential stepped structure, and wherein the bottom surface of the lowest optical waveguide is connected to the top surface of the lower optical waveguide and the top surface of the highest optical waveguide is connected to the bottom surface of the upper optical waveguide.

13. A method of manufacturing a multi-layer optical planar waveguide, comprising the steps of:
   (a) forming a lower core layer at a given portion of a substrate;
   (b) coating a cladding material on the entire structure;
   (c) etching the cladding material so that a portion of a lower core layer at a region where a multimode interference coupler will be formed, thus forming a lower clad layer;
   (d) coating a core material on the entire structure;
   (e) etching the core material to form a multimode interference coupler and all upper core layer; and
   (f) coating the cladding material on the entire structure to form an upper clad layer.

14. The method as claimed in claim 13, further including the steps of flattening the core material by means of etching process or polishing process, after said step (d).

15. The method as claimed in claim 14, wherein said multi-mode interference coupler is formed at a portion among the photoresist polymer from which the UV light is shielded by the metal mask.

16. The method as claimed in claim 14, wherein said multimode interference coupler is thicker in thickness than the lower core layer or the upper core layer.

17. The method as claimed in claim 14, wherein one side of said multimode interference coupler is connected to the lower core layer and the other side of said multimode interference coupler is connected to the upper core layer.

18. The method as claimed in claim 13, wherein said substrate is a silicon substrate or a glass substrate.

19. The method as claimed in claim 13, wherein said multimode interference coupler is thicker in thickness than the lower core layer or the upper core layer.

20. The method as claimed in claim 13, wherein one side of said multimode interference coupler is connected to the lower core layer and the other side of said multimode interference coupler is connected to the upper core layer.

21. A method of manufacturing a multi-layer optical planar waveguide, comprising the steps of:
   (a) forming the lower core layer at a given portion of a substrate;
   (b) coating the cladding material on the entire structure;
   (c) etching the entire cladding material down to the top of the lower core layer;
   (d) coating the core material on the entire structure;
   (e) etching the core material down to the top of the lower core layer remaining the multimode interference coupler region;
   (f) coating the cladding material on the entire structure;
   (g) etching the cladding material down to the top of multimode interference coupler region;
   (h) coating the core material on the entire structure;
   (i) etching the core material to form a multimode interference coupler and an upper core layer; and
   (j) coating the cladding material on the entire structure to form an upper clad layer.

22. A method of manufacturing a multi-layer optical planar waveguide, comprising the steps of:
   (a) Forming a lower core layer at a portion of a glass substrate using ion-exchanged method;
   (b) coating photoresist polymer the refractive index of which is changed by means of UV light on the entire structure;
   (c) forming an upper core layer at a portion in the photoresist polymer;
   (d) forming an upper clad layer on the entire structure;
   (e) locating a metal mask on the upper clad layer corresponding to a region where a multimode interference coupler will be formed; and
   (f) illuminating an UV light on the entire structure to form the multimode interference coupler and a lower clad layer in the photoresist polymer.

* * * * *